Figure 1:
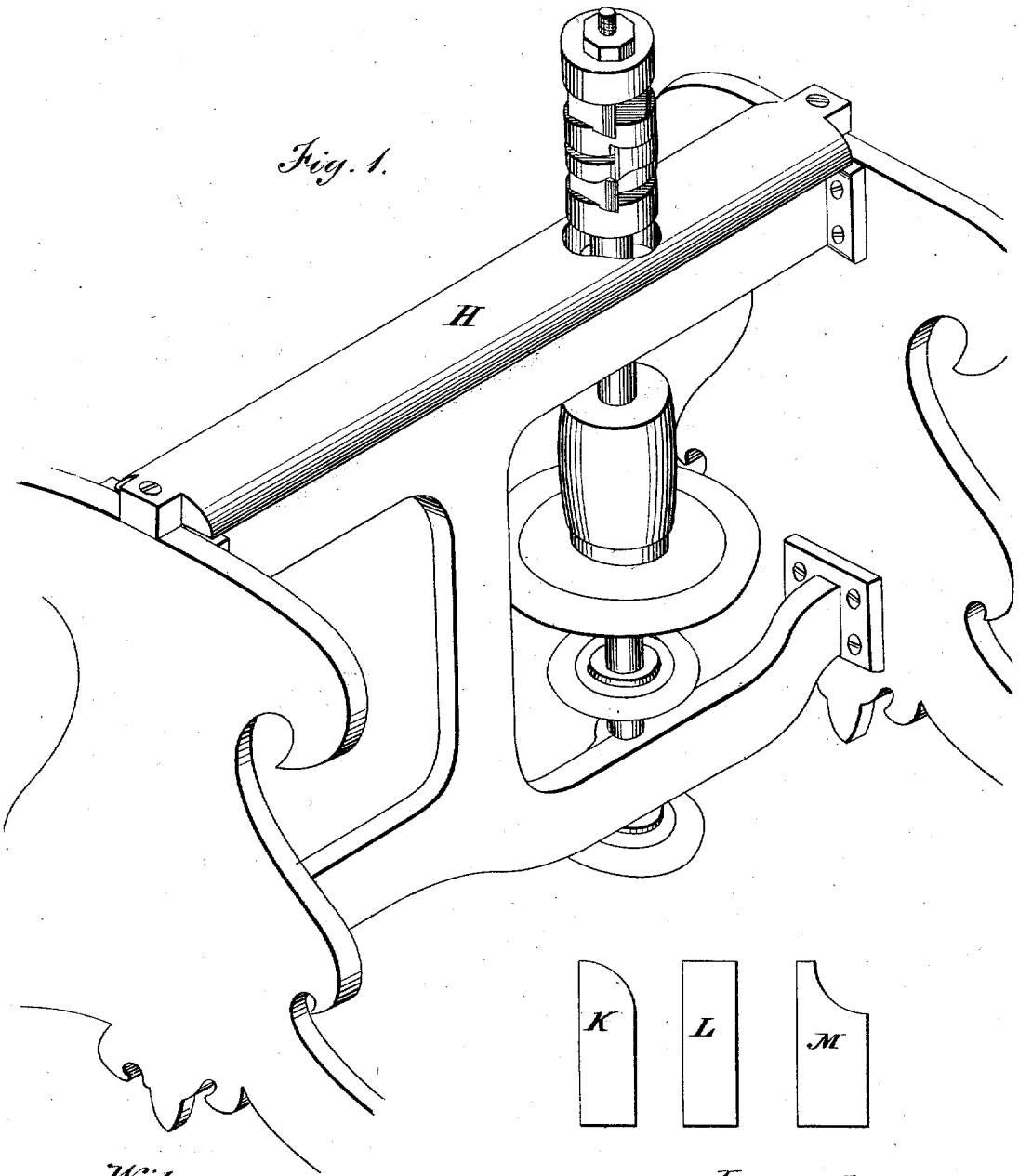

2 Sheets--Sheet 1.

J. P. GROSVENOR.

Machines for Cutting Irregular Forms.

No. 5,721. Reissued Jan. 6, 1874.

Witnesses—
Chas Rogers
C. F. Brown

Inventor—
Jonathan P. Grosvenor

AM. PHOTO-LITHOGRAPHIC Co. N.Y. (OSBORNE'S PROCESS.)

2 Sheets--Sheet 2.
J. P. GROSVENOR.
Machines for Cutting Irregular Forms.
No. 5,721. Reissued Jan. 6, 1874.
Fig. 2.
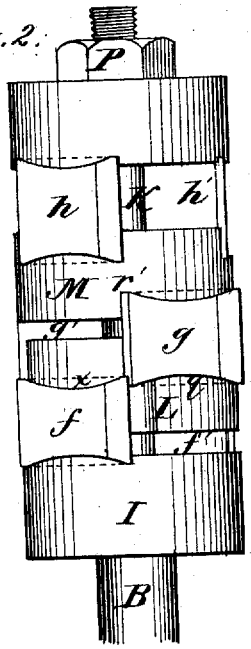
Fig. 3.
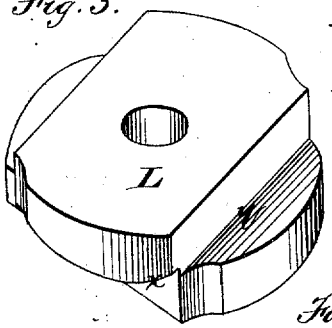
Fig. 4.
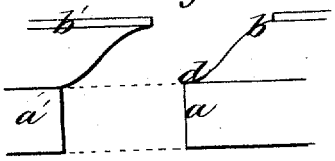
Fig. 5.
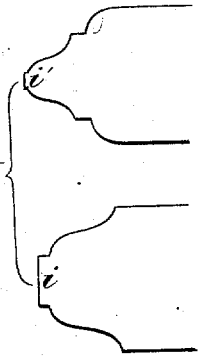
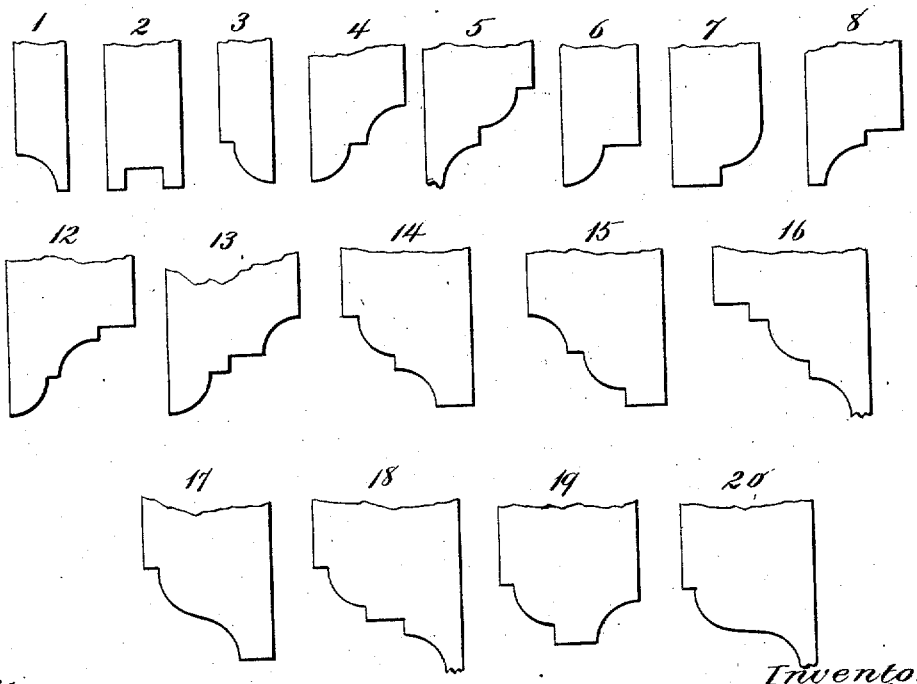
Witnesses.
Chas Rogers
C. F. Thorn
Inventor.
Jonathan P. Grosvenor
AM. PHOTO-LITHOGRAPHIC Co. N.Y. (OSBORNE'S PROCESS)

UNITED STATES PATENT OFFICE.

JONATHAN P. GROSVENOR, OF LOWELL, MASSACHUSETTS.

IMPROVEMENT IN MACHINES FOR CUTTING IRREGULAR FORMS.

Specification forming part of Letters Patent No. 20,345, dated May 25, 1858; extended seven years; reissue No. 5,721, dated January 6, 1874; application filed December 16, 1872.

*To all whom it may concern:*

Be it known that I, JONATHAN P. GROSVENOR, of the city of Lowell, and county of Middlesex, and State of Massachusetts, have invented certain new and useful Improvements in Machines for Cutting Moldings upon Irregular Forms; and I do hereby declare that the following is a full, clear, and exact description thereof, reference being had to the accompanying drawings and to the letters of reference marked thereon, making a part of this specification, in which—

Figure I is a perspective view of a machine with my improvement attached. Fig. II is an elevation of the cutter-head. Figs. III, IV, and V are details, which will be hereafter referred to.

My improvements are more particularly applicable to machines for cutting moldings upon both regular and irregular forms. Machines of this class, as heretofore constructed, are furnished with a table, upon which the material to be cut is placed. When, however, the article is curved in two or more planes, forming angles with each other, the molding cannot be cut upon the above machines, as such articles cannot lie flat upon a plane surface. Neither can a molding be put upon the face of a curved sofa front upon these machines, as heretofore constructed, or upon any article where the lines of the molding are required to deviate from a straight line.

To meet this and parallel cases is the object of my invention, which consists in dispensing with the table, and in the employment in place thereof of a rest in combination with the cutter-head, by which means moldings may be cut upon the articles curved in any possible variety of directions, or upon the face as well as the edges of irregular or curved forms.

In the cutter-heads of this class of machines the cutters have been made of sufficient width or length to form the entire molding; but this has been found objectionable for several reasons, principally on account of the great original cost of the cutters, and also on account of their liability to break, and the difficulty of securing a cutter of such large dimensions firmly to the cutter-head. To remedy this defect I have heretofore devised an improved cutter-head, for which Letters Patent of the United States were granted to me the 2d day of December, 1856. In this cutter-head the molding-cutter was made in short sections, which were secured in place—one above the other—by means of certain intermediate core-blocks and collars. With this arrangement it was not found practicable to bring the cutters sufficiently near to each other to make a smooth cut at the angles of the moldings; and to remedy this inconvenience is one object of the second part of my invention, which consists in setting the adjacent cutters at right angles to each other when they are held to the head by grooves upon the upper and under surface of the collars which hold them to the spindle, whereby the cutting-edges of the cutters may be allowed to pass or overlap each other, and a clean well-defined line may be given to the edges of the molding.

This I will illustrate by reference to diagram, Fig. IV. Suppose the portion of the molding to be formed with one cutter, and the portion *b* with another, and that these cutters were placed immediately over each other and in the same place, it is obvious that it would not be possible to cause the cutters to meet sufficiently to leave a clean well-formed edge at the point *d;* but by placing each pair of cutters—two for the part *a* and two for the part *b*—at right angles with those beneath them, I am enabled to make them sufficiently broad to overlap each other, and thus insure a sharp edge at the junction of the two cuts. For instance, in Fig. IV the portion *b* of the molding is formed by the cutters *b'*, and the part *a* by the cutter *a'*. Now, by setting these cutters at right angles to each other, the cutter *a'* may be made wider than the part *a*, by which it is caused to overlap the other cutter, and thus a sharp edge is formed at *d*, where the paths of the cutters intersect each other. Furthermore, it often happens that a plain member, as at *i*, Fig. 5, occurs in the center of a molding, which is more deeply cut away both above and below it.

With the machine at present in use such molding is cut at two operations, the stuff being turned over after one-half of the molding is cut; but it could only be cut at one operation upon these machines by the use of a pattern.

With this member of a considerable width, as at *i*, Fig. 5, the mold could be cut at one operation upon my old machine before referred to, the part *i* resting upon the intermediate collar between the centers. When, however, the part *i* is very narrow, or when, as at *i*, it is ultimately to be finished to a curve, the collar would be too much weakened were the grooves for the cutters cut so far through as to bring the cutters sufficiently near for the purpose. With my improved cutter-head, this inconvenience is avoided, and these and similar moldings may be cut at a single operation. The adjacent cutters being at right angles to each other, I am enabled to make the plain portion of the collar *r*, Fig. II, as narrow as may be required without weakening the collar.

To carry out this part of my invention, in place of the table heretofore making a part of the machines of this class, I employ a single bar or rest, H, the top of which is curved and serves the purpose to support the article upon which the molding is being cut. By means of this rest, in combination with the cutters, moldings may be cut upon articles which are irregularly curved and bent, such as stair-rails, which are often curved at different points in planes forming angles with each other, and also upon the face of irregularly shaped and curved articles, as sofa-fronts and other similar articles now usually cut by hand. Such articles cannot be cut upon ordinary table-machines, as they afford no means of turning them out of the horizontal plane of the table-top.

In Fig. II is represented my improved cutter-head. The spindle K and lower collar I are in one piece with the shaft B, or are firmly secured thereto. The cutters *f f'* are secured directly opposite to and parallel with each other between the stationary collar I and a removable collar, L, the cutter being held between the collars in grooves X Y in the upper and under surfaces of the collars. The next set of cutters, *g g'*, are placed above the first set, but in planes at right angles thereto, and in order that the cutters may overlap or cut past each other, as above described, the tops of the grooves X rise above the bottom of the grooves Y, and the bottom of the upper cutter is thrown below the top of the lower cutter, as required.

The third part of my invention will be understood by a reference to figure 2 between the cutters *g g'* and *h h'*. It will be observed that a portion of the collar M is left as seen at *r'*, and against this portion of the collar the plain member of the molding, or that part which is not to be cut, is allowed to bear in, as the adjacent cutters are set at right angles to each other. They are brought as near together as may be required, and thus this portion *r'* may be made as narrow as necessary without weakening the collar, and this is the object of this part of my invention.

The collars are arranged, as required, upon the spindle *k*, and the whole are secured together by the nut P.

Thus far I have spoken of the cutters as placed at right angles to each other; but it is obvious that this angle is not rigid, for the cutters may incline to each other at angles varying more or less from ninety degrees without departing from the spirit of my invention.

Among the advantages which the above-described method of setting the cutters possesses may be stated the great facility it affords of producing a variety of moldings. By the combination of a few simple inexpensive cutters—for instance, three cutters, marked K L M—a great variety of moldings may be cut, a few of which are represented at 1 to 20.

This combination of cutters could not be made upon a head carrying its cutter one above the other, as the cutters could not be made to meet sufficiently close at the joinings. The rest H may also be varied in form from that which is represented in the drawings—for instance, in lieu of making it rigid and stationary, it may be replaced by a feed-roll. I do not therefore limit myself to the exact form of rest represented in the drawings, but intend to employ a rest of such character as may be best adapted to the work in hand.

Having thus described my invention, what I claim as new, and desire to secure by Letters Patent of the United States, is—

1. The rest H, in combination with a cutter-head, operating in the manner set forth, for the purposes specified.

2. A series of cutters secured at angles with each other upon a cutter-head, by means of a mandrel and intermediate collars, and made to overlap each other in their operation, substantially as herein shown and described.

JONATHAN P. GROSVENOR.

Witnesses:
CHAS. ROGERS,
JAMES S. GRINNELL.